United States Patent [19]
Narayanan et al.

[11] 3,873,559
[45] Mar. 25, 1975

[54] HETEROCYCLIC CARBOXAMIDO THIAZOLINYL INDOLES

[75] Inventors: Venkatachala L. Narayanan, Highstown; Rudiger D. Haugwitz, Titusville, both of N.J.

[73] Assignee: E. R. Squibb & Sons, Inc., Princeton, N.J.

[22] Filed: Mar. 30, 1973

[21] Appl. No.: 346,545

[52] U.S. Cl..................... 260/306.7 T, 260/243 R, 260/250 BN, 260/256.5 R, 260/293.61, 260/294.8 C, 424/270, 424/246
[51] Int. Cl. ..................................... C07d 97/10
[58] Field of Search ................. 260/306.7 T, 243 R

[56] References Cited
UNITED STATES PATENTS
3,755,316   8/1973   Narayanan et al. .......... 260/306.7 T

OTHER PUBLICATIONS

Elderfield (ed.), Heterocyclic Compounds, Vol. 5, N.Y.C., John Wiley & Sons, 1957, p. 490.

Primary Examiner—Richard J. Gallagher
Attorney, Agent, or Firm—Lawrence S. Levinson; Merle J. Smith; Donald J. Barrack

[57] ABSTRACT

Novel indoles having a thiazolinyl or thiazinyl group in the 1-position and a heterocyclic carboxamido group in either the 5- or 6-position are useful as anti-inflammatory agents.

3 Claims, No Drawings

HETEROCYCLIC CARBOXAMIDO THIAZOLINYL INDOLES

SUMMARY OF THE INVENTION

Indoles having a thiazolinyl or thiazinyl group in the 1-position and a heterocyclic carboxamido group in either the 5- or 6-position are anti-inflammatory agents. Heterocyclic carboxamido thiazolinyl and thiazinyl indoles having the structure:

(I)
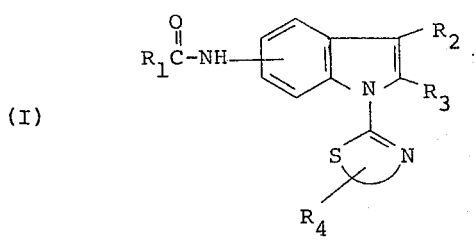

are preferred. The carboxamido group is attached to the indole in either the 5- or the 6-position. In formula I, and throughout the specification, the symbols are as defined below.

$R_1$ is a monocyclic heterocycle of 5 or 6 atoms containing one or two hetero atoms selected from nitrogen, sulfur, and oxygen. The $R_1$ group may be bonded to the carbonyl group at any one of the carbons of the heterocyclic group.

$R_2$ is hydrogen, lower alkyl, phenyl, $-(CH_2)_{n_1}COOR_5$, cyano, halogen, or di-(lower alkyl)amino lower alkyl. $R_5$ is hydrogen, lower alkyl, or phenyl, and $n_1$ is 0 to 5.

$R_3$ is hydrogen, lower alkyl, phenyl, or $-(CH_2)_{n_1}COOR_5$.

$R_4$ is hydrogen, lower alkyl, or phenyl.

The group

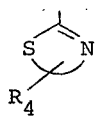

represents a 5- or 6-membered ring containing 3 or 4 carbon atoms, respectively, wherein the 2 or 3 carbon atoms not shown may include a substituent as shown.

The term "lower alkyl" as employed herein includes both straight and branched chain radicals of up to eight carbon atoms, e.g., butyl, 4,4-dimethylpentyl, ethyl, hexyl, isopropyl, methyl, octyl, pentyl, propyl, t-butyl, 2,2,4-trimethylpentyl, and the like.

The term "halogen" includes F, Br, Cl, and I (Br and Cl are preferred).

DETAILED DESCRIPTION OF THE INVENTION

Indoles containing a 2-thiazolin-2-yl or 2-thiazin-2-yl group in the 1-position and a heterocyclic carboxamide of the formula

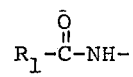

in either the 5- or the 6-position are anti-inflammatory agents.

Compounds of formula I are preferred, and compounds of formula (I) wherein $R_2$, $R_3$, and $R_4$ are hydrogen are especially preferred.

It is preferred that $R_1$ be selected from furan, imidazole, isoxazole, oxazole, piperidine, pyrazine, pyrazole, pyridine, pyrimidine, pyrrole, thiazine, thiazole, and thiophene.

The compounds of formula (I) form physiologically acceptable acid-addition salts with inorganic and organic acids. These acid-addition salts frequently provide useful means for isolating the products from reaction mixtures by forming the salt in a medium in which it is insoluble. The free base may then be obtained by neutralization, e.g., with a base such as sodium hydroxide. Then any other salt may again be formed from the free base and the appropriate inorganic acid. Illustrative are the hydrohalides, especially the hydrochloride and hydrobromide which are preferred, sulfate, nitrate, phosphate, tartrate, maleate, fumarate, citrate, succinate, methanesulfonate, benzenesulfonate, toluenesulfonate, and the like.

The heterocyclic carboxamido thiazolinyl and thiazinyl indoles of this invention are synthesized from indoles having the structure (II)
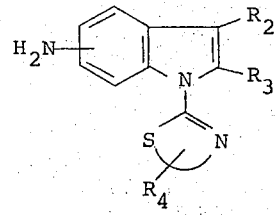

wherein the amino group is in either the 5- or the 6-position. The indole of formula (II) is reacted with an acid chloride having the formula (III) 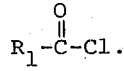

The molar ratio of indole of formula II to acid chloride of formula III is 0.95 to 1.05. The reaction is carried out at a temperature of from 0°C to 120°C for 15 minutes to 1 day. The reaction is carried out in an organic solvent, e.g., benzene, tetrahydrofuran, glyme, or toluene, and optionally, in the presence of a base, e.g. triethylamine, pyridine, or quinoline.

The acid chlorides of formula III may be prepared from the corresponding carboxylic acids by conventional methods such as reaction with thionyl chloride. The following carboxylic acids are exemplary:

1-furancarboxylic acid
2-furancarboxylic acid
2-imidazolecarboxylic acid
4-imidazolecarboxylic acid
3-isoxazolecarboxylic acid
4-isoxazolecarboxylic acid
5-isoxazolecarboxylic acid
4-oxazolecarboxylic acid
2-piperidinecarboxylic acid
3-piperidinecarboxylic acid
4-piperidinecarboxylic acid
2-pyrazinecarboxylic acid
3-pyrazolecarboxylic acid 2-pyridinecarboxylic acid
3-pyridinecarboxylic acid
4-pyridinecarboxylic acid
2-pyrimidinecarboxylic acid
2-pyrrolecarboxylic acid
3-pyrrolecarboxylic acid
4-pyrrolecarboxylic acid
4-thiazinecarboxylic acid
4-thiazolecarboxylic acid
1-thiophenecarboxylic acid
2-thiophenecarboxylic acid Alternatively, the heterocyclic carboxamido thiazolinyl and thiazinyl indoles of this invention may be prepared by treating the indoles of formula II with an anhydride having the formula

(IV)

The reactivity of the anhydride is usually lower than that of the corresponding acid chloride, and a longer reaction period is usually necessary.

Preparation of the indoles of formula II is disclosed in copending United States patent application Ser. No. 191,092, filed Oct. 20, 1971, now U.S. Pat. No. 3,755,316, the disclosure of which is incorporated herein by reference.

Specifically, the 5- or 6-amino indoles of formula II are prepared from the corresponding 5- or 6-nitro indoles, i.e., indoles having the formula

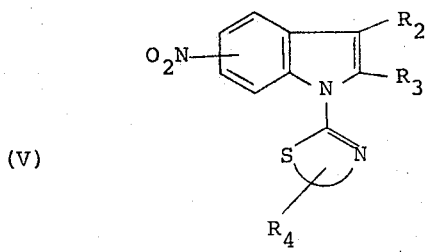

(V)

wherein the nitro group is in either the 5- or the 6-position. Reduction of the nitroindole to an aminoindole may be carried out by first dissolving the nitroindole in an organic solvent such as an alcohol (e.g. ethanol), tetrahydrofuran, dioxane, etc., and then reducing catalytically using hydrogen under pressure in the presence of a catalyst such as Raney nickel. The reduction reaction may be carried out at a pressure of from about 30 to 80 psi for a period of about 2 hours to 1 day.

The compounds of this invention are used to treat inflammation in mammalian species, e.g., rats, dogs, cats, monkeys, etc. Joint tenderness and stiffness (in conditions such as rheumatoid arthritis) are relieved by the above described indoles.

The indoles of this invention may be formulated for use as anti-inflammatory agents according to accepted pharmaceutical practice in oral dosage forms such as tablets, capsules, elixirs, or powders, or in an injectable form in a sterile aqueous vehicle prepared according to conventional pharmaceutical practice. The compounds of the invention may be administered in amounts of about 100 mg/70kg/day to 2g/70kg/day, preferably 100 mg/70kg/day to 1g/70kg/day.

The following examples further illustrate the invention.

EXAMPLE 1

N-[1-(2-Thiazolin-2-yl)-5-indolyl]-4-thiazolecarboxamide a. 5-Amino-N-(2-thiazolin-2-yl)-indole 4.0 g. of 5-Nitro-N-(2-thiazolin-2-yl)indole (0.016 mole) is dissolved in 100 ml. of tetrahydrofuran and approximately one teaspoon of Raney nickel catalyst is added. The mixture is then hydrogenated at 65 psi over a period of 16 hours. The Raney nickel is removed and a thin-layer chromatograph run on the THF solution indicates complete reduction (5 percent MeOH/CHCl$_3$-silica gel). 5-Amino-N-(2-thiazolin-2-yl)indole is recovered from the solution.

b. N-[1-(2-Thiazolin-2-yl)-5-indolyl]-4-thiazolecarboxamide 2.0 g. of 4-Thiazolecarboxylic acid (0.16 mole) is heated in 18 ml. of thionyl chloride at reflux for 2.5 hours; a clear, yellow solution results. Excess thionyl chloride is removed under vacuum at 35°C leaving the acid chloride derivative of thiazolecarboxylic acid as a white crystalline solid.

The acid chloride is dissolved in 15 ml. of dry tetrahydrofuran and slowly added to a solution of 3.5 g. of 5-amino-N-(2-thiazolin-2-yl)indole (0.016 mole) at room temperature. The mixture is then refluxed for 3 hours and cooled to room temperature. The precipitated white solid is collected, washed with water and crystallized from methanol yielding 1.8 g. of N-[1-(2-thiazolin-2-yl)-5-indolyl]-4-thiazolecarboxamide in the form of white crystals, melting point 190°C–192°C.

EXAMPLE 2

N-[1-(2-Thiazolin-2-yl)-5-indolyl]-4-thiazinecarboxamide

Following the procedure set forth in Example 1(b), 10 mmoles of 4-thiazinecarboxylic acid is converted to its acid chloride derivative.

The acid chloride is dissolved in dry tetrahydrofuran and slowly added to a solution of 10 mmoles of 5-amino-N-(2-thiazolin-2-yl)indole at room temperature. The mixture is then refluxed for 3 hours and cooled to room temperature to yield N-[1-(2-thiazolin-2-yl)-5-indolyl]-4-thiazinecarboxamide.

EXAMPLE 3

N-[1-(2-Thiazolin-2-yl)-5-indolyl]-2-oxazolecarboxamide

Following the procedure set forth in Example 1(b), 10 mmoles of 2-oxazolecarboxylic acid is converted to its acid chloride derivative.

The acid chloride is dissolved in dry tetrahydrofuran and slowly added to a solution of 10 mmoles of 5-amino-N-(2-thiazolin-2-yl)indole at room temperature. The mixture is then refluxed for 3 hours and cooled to room temperature to yield N-[1-(2-thiazolin-2-yl)-5-indolyl]-2-oxazolecarboxamide.

EXAMPLES 4–14

In Examples 4–14 the nitroindole of Column 1 is reduced to the corresponding 5- or 6-aminoindole following the procedure set forth in Example 1(a). Following the procedure set forth in Example 1(b) the heterocyclic carboxylic acid of Column 2 is converted to the corresponding acid chloride and reacted with the aminoindole to give the carboxamide of Column 3.

| Example | R₂ | R₃ | Position of -NO₂ group | R | R₁ | Product |
|---|---|---|---|---|---|---|
| 4 | C₂H₅ | CH₃ | 5 | thiazoline | furan | (structure) |
| 5 | phenyl | H | 6 | thiazoline | thiophene | (structure) |
| 6 | (CH₃)₂N-C₂H₄ | H | 5 | dihydrothiazine | 2-imidazole | (structure) |
| 7 | (C₃H₇)₂N-CH₂ | H | 6 | 4-methyl-dihydrothiazine | oxazole | (structure) |
| 8 | COOH | H | 5 | 5-methyl-thiazoline | pyrrole | (structure) |
| 9 | C₅H₁₀COOCH₃ | H | 5 | 4-phenyl-thiazoline | piperidine | (structure) |
| 10 | C≡N | H | 6 | thiazoline | furan | (structure) |
| 11 | Cl | H | 5 | thiazoline | thiophene | (structure) |
| 12 | H | C₄H₉ | 6 | 4-phenyl-dihydrothiazine | 2-imidazole | (structure) |

| Example | $R_2$ | $R_3$ | Position of $-NO_2$ group | R | $R_1$ | |
|---|---|---|---|---|---|---|
| 13 | H | $C_3H_6COOH$ | 5 | | | |
| 14 | COOH | COOH | 6 | | | |

What is claimed is:

1. An indole having the formula

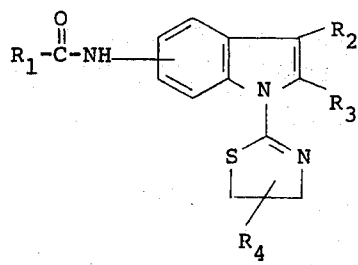

or a physiologically acceptable acid-addition salt thereof, wherein $R_1$ is selected from the group consisting of furan, imidazole, isoxazole, oxazole, pyrazole, pyrrole, thiazine, thiazole and thiophene; $R_2$ is selected from the group consisting of hydrogen, lower alkyl, phenyl, $-(CH_2)_{n^1}COOR_5$, cyano, halo, and di(lower alkyl)amino lower alkyl; $R_3$ is selected from the group consisting of hydrogen, lower alkyl, phenyl and $-(CH_2)_{n^1}COOR_5$; $R_4$ and $R_5$ are each selected from the group consisting of hydrogen, lower alkyl and phenyl; and $n^1$ is 0, 1, 2, 3, 4 or 5.

2. An indole in accordance with claim 1 wherein $R_2$, $R_3$, and $R_4$ is each hydrogen.

3. An indole in accordance with claim 1 having the name N-[1-(2-thiazolin-2-yl)-5-indolyl]-4-thiazolecarboxamide.

* * * * *